United States Patent
Sarin et al.

(10) Patent No.: US 11,461,621 B2
(45) Date of Patent: Oct. 4, 2022

(54) METHODS AND SYSTEMS OF IMPLEMENTING POSITIVE AND NEGATIVE NEURONS IN A NEURAL ARRAY-BASED FLASH MEMORY

(71) Applicants: Vishal Sarin, Santa Clara, CA (US); Purackal Mammen Mammen, Fremont, CA (US); Taber Smith, Saratoga, CA (US)

(72) Inventors: Vishal Sarin, Santa Clara, CA (US); Purackal Mammen Mammen, Fremont, CA (US); Taber Smith, Saratoga, CA (US)

( * ) Notice: Subject to any disclaimer, the term of this patent is extended or adjusted under 35 U.S.C. 154(b) by 731 days.

(21) Appl. No.: 16/452,217

(22) Filed: Jun. 25, 2019

(65) Prior Publication Data
US 2020/0160156 A1 May 21, 2020

Related U.S. Application Data

(60) Provisional application No. 62/803,562, filed on Feb. 10, 2019, provisional application No. 62/773,773, (Continued)

(51) Int. Cl.
*G06N 3/063* (2006.01)
*G06N 3/04* (2006.01)
(Continued)

(52) U.S. Cl.
CPC ......... *G06N 3/063* (2013.01); *G06F 7/49942* (2013.01); *G06F 17/16* (2013.01);
(Continued)

(58) Field of Classification Search
CPC ..... G06F 17/16; G06F 7/49942; G06N 3/063; G06N 3/04; G06N 3/049; G06N 3/0635; G06N 3/082
(Continued)

(56) References Cited

U.S. PATENT DOCUMENTS

| 11,188,581 B2 * | 11/2021 | Ronayne | G06N 3/084 |
| 2014/0344201 A1 * | 11/2014 | Arthur | G06N 3/063 706/27 |
| 2020/0160165 A1 * | 5/2020 | Sarin | G06F 7/49942 |

* cited by examiner

*Primary Examiner* — Tan V Mai

(57) ABSTRACT

In one aspect, A method for computing neural network computation includes the step of, providing plurality of neurons, coupled with a plurality of inputs, through a plurality of synapses. Each neuron output is given by an equation $\Sigma(X_i{}^*Y_i)+b$. $X_i{}^*Y_i$ comprises the ith synapse of the neuron. $X_i$ comprises a set of $X_i$ input vectors. Each $X_i$ input vector is translated into an equivalent electrical signal for an ith corresponding synapse of the plurality of neurons, $Y_i$ comprises a set of Yi weight vectors, wherein each $Y_i$ weight vector comprises a parameter for the ith corresponding synapse of the plurality of neurons. Each synapse is a sub-system and the sub-system comprises a negative vector neural circuit, a positive vector neural circuit, and a set of four non-volatile memory weight cells for computation. The method includes the step of identifying the input vector x as a positive input vector or a negative input vector.

23 Claims, 6 Drawing Sheets

Related U.S. Application Data filed on Nov. 30, 2018, provisional application No. 62/721,116, filed on Aug. 22, 2018, provisional application No. 62/689,839, filed on Jun. 26, 2018.

(51) Int. Cl.
    *G06F 17/16*     (2006.01)
    *G06F 7/499*     (2006.01)
    *G06N 3/08*     (2006.01)

(52) U.S. Cl.
    CPC ............... *G06N 3/04* (2013.01); *G06N 3/049* (2013.01); *G06N 3/0635* (2013.01); *G06N 3/082* (2013.01)

(58) Field of Classification Search
    USPC .......................................................... 706/33
    See application file for complete search history.

METHODS AND SYSTEMS OF IMPLEMENTING POSITIVE AND NEGATIVE NEURONS IN A NEURAL ARRAY-BASED FLASH MEMORY

CROSS-REFERENCE TO RELATED APPLICATIONS

This application claims priority to U.S. provisional patent application No. 62/689,839, titled FORMING NEURONS WITH USING SLC FLASH CELLS and filed on 26 Jun. 2018. This application is hereby incorporated by reference in its entirety.

This application claims priority to U.S. provisional patent application No. 62/721,116, titled METHODS AND SYSTEMS OF NEURAL-ARRAY BASED FLASH MEMORY and filed on 22 Aug. 2018. This application is hereby incorporated by reference in its entirety.

This application claims priority to U.S. provisional patent application No. 62/773,773, titled FORMING NEURONS WITH USING SLC FLASH CELLS and filed on 30 Nov. 2018. This application is hereby incorporated by reference in its entirety.

This application claims priority to U.S. provisional patent application No. 62/803,562, titled DIFFERENT FLASH CELLS FOR NEURONS and filed on 2 Oct. 2019. This application is hereby incorporated by reference in its entirety.

BACKGROUND

Neural networks are increasingly used for various use cases for artificial intelligence such as vision analysis—object detection, tracking etc.; natural language processing; anomaly detection on a range of devices, analysis on industrial and medical sensors; and many other such applications. A key element of neural network computing is to enable trillions of multiply-add operations which makes it very compute and power hungry. The implementation techniques for neural networks presented in the current invention enables such compute operations at very high-performance levels, while consuming very low energy. This opens up a wide range of possible applications that can benefit from neural networks.

1. Field

This application relates generally to electronic circuits, and more particularly to a system, method and article of manufacture of operating a neural circuit in a neural-array based flash memory.

2. Related Art

Neural networks are increasingly used for various use cases for artificial intelligence, such as, inter alia: vision analysis (e.g. object detection, tracking, etc.); natural language processing; anomaly detection on a range of devices; analysis on industrial and medical sensors; and many other such applications. A key element of neural network computing is to enable trillions of multiply-add operations which makes it very compute and power hungry. The implementation techniques for neural networks presented in the current invention enables such compute operations at very high performance levels while consuming very low energy. This opens up the possible applications which can benefit from neural networks.

SUMMARY OF THE INVENTION

In one aspect, A method for computing neural network computation includes the step of, providing plurality of neurons, coupled with a plurality of inputs, through a plurality of synapses. Each neuron output is given by an equation $\Sigma(X_i{}^*Y_i)+b$. $X_i{}^*Y_i$ comprises the ith synapse of the neuron. $X_i$ comprises a set of $X_i$ input vectors. Each $X_i$ input vector is translated into an equivalent electrical signal for an ith corresponding synapse of the plurality of neurons, $Y_i$ comprises a set of Yi weight vectors, wherein each $Y_i$ weight vector comprises a parameter for the ith corresponding synapse of the plurality of neurons. Each synapse is a sub-system and the sub-system comprises a negative vector neural circuit, a positive vector neural circuit, and a set of four non-volatile memory weight cells for computation. The method includes the step of identifying the input vector x as a positive input vector or a negative input vector.

Figure 1:
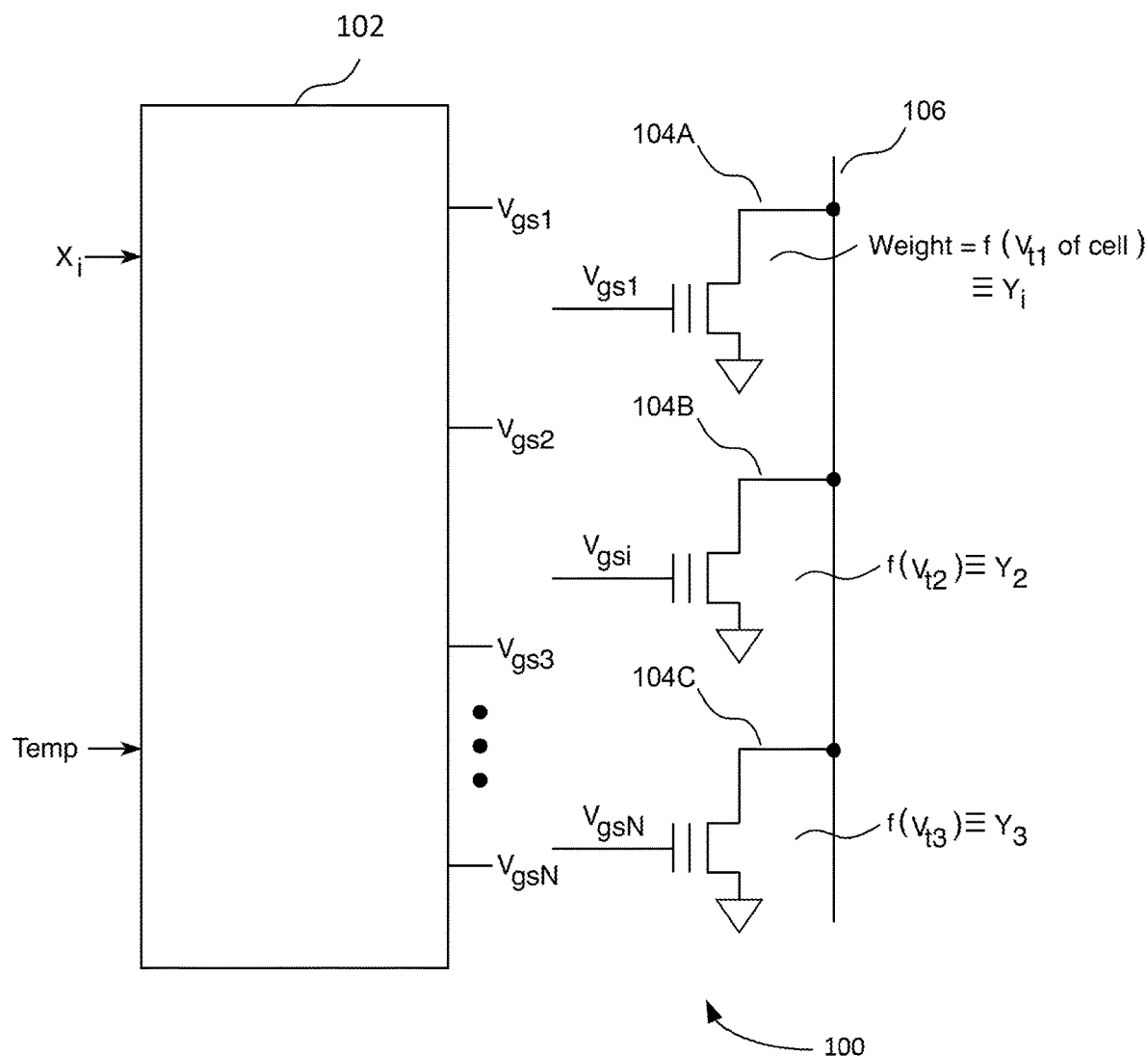
FIG. 1 gives an example of a multi-level cell (MLC) flash cells, according to some embodiments.

The Figures described above are a representative set and are not an exhaustive with respect to embodying the invention.

DESCRIPTION

Disclosed are a system, method, and article of manufacture of implementing positive and negative neurons in a neural array, based on non-volatile memory. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Non-Volatile Memory (NVM) is an electronic solid-state medium that can be electrically erased and reprogrammed.

Flash memory is a type of NVM that uses one or more transistors.

Single Level Cell (SLC) is a type of flash memory that stores one digital bit of information per memory cell.

Multi-Level Cell (MLC) is a type of flash memory that stores multiple digital bits of information per memory cell.

Analog-to-digital converter (ADC) is a system that converts an analog into a digital signal.

Digital-to-analog converter (DAC) is a system that converts a digital signal into an analog signal.

Least significant bit (LSB) can be the bit with the lowest significance in a word.

Most significant bit (MSB) can be the bit with the highest significance in a word.

Metal-oxide-semiconductor field-effect transistor (MOSFET) is a type of field-effect transistor (FET). It can have an insulated gate; whose voltage determines the conductivity of the device. This ability to change conductivity with the amount of applied voltage can be used for amplifying or switching electronic signals.

Neuron, or neural cell, can be a system of non-volatile memory cells. In some examples, the equation for a neuron can be:

$Eq^{neuron} \equiv \Sigma(X_i * Y_i) + b$. Here, $X_i$ is the set of input vectors, $Y_i$ is the parameter which can be related to the amplification of the output relative to the input of individual non-volatile memory cells, and b is a bias variable.

Neural array can be a plurality of coupled neural cells.
NMOS can be an n-channel MOSFET.

EXAMPLE COMPUTER ARCHITECTURE AND SYSTEMS

FIG. 1 illustrates an example first system 100 for forming neurons (e.g. neuron circuits) using NVM cells, according to some embodiments, which increase or decrease their individual contribution to the bit line 106. In some embodiments, each cell in System 100 can provide single levels of information per cell, i.e. SLC memory. In other embodiments, each cell in System 100 can provide multiple levels of information per cell, i.e. MLC memory. In some embodiments, the underlying cell technology may be flash memory (e.g. made of floating-gate transistors, as shown in FIG. 1). The cells of system 100 can be used to generate a neuron. The neuron equation is provided as follows:

$Eq^{neuron} \equiv \Sigma(X_i * Y_i) + b$ $Y_i$ is the set of parameters of weight vectors (e.g. as provided by flash cells 104 A-C) and each $Y_i$ is a parameter of a non-volatile memory cell. In one embodiment, this can be one or more threshold voltages for an individual flash memory cell. Each $X_i \cdot Y_i$ combination forms a level. The levels are coupled with bitline 106. Bitline 106 receives a specified output from the neural cell as provided by the neuron equation. b is the bias variable of the equation. In one embodiment, b can be set as a fixed bias current per bit line.

In some embodiments, the analog weight is stored in multiple levels of a single non-volatile memory cell (e.g. one or more threshold voltages for an individual MLC flash cell).

In other embodiments, the analog weight of $Y_i$ is translated into N digital bits. Each digital bit is stored in a non-volatile memory cell from MSB (e.g. 120 A-B) to LSB (122 A-B). In the case of a flash memory implementation, each weight vector can be stored as a threshold voltage ($V_t$) of a SLC flash cell.

In some examples, the flash cells can be flash NMOS cells. In this way, system 100 illustrates an example of the application of these properties for forming neurons using MLC flash cells.

Figure 2:
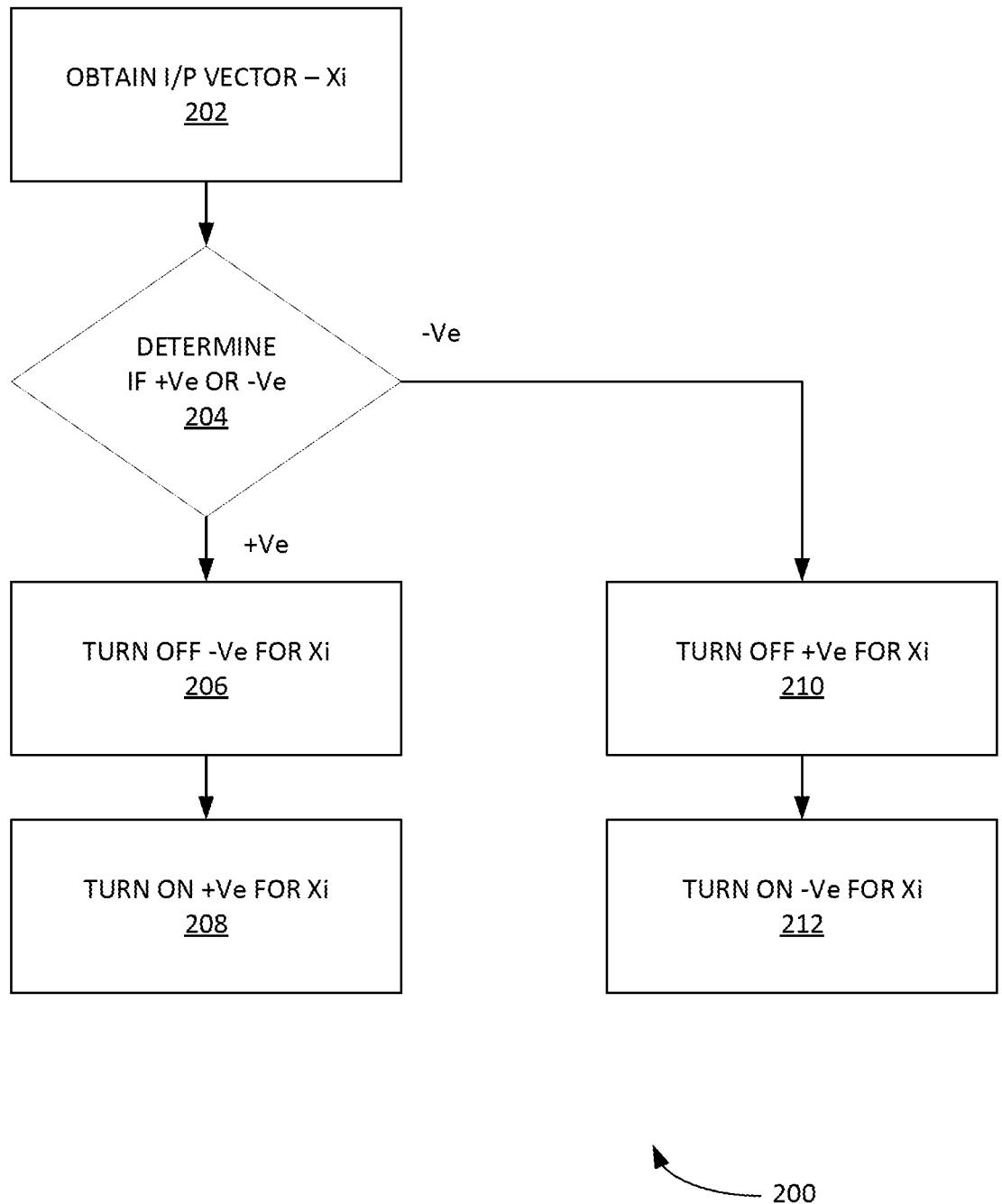
FIG. 2 illustrates an example process for selecting positive and negative input vectors for connecting to a positive or negative bit line in a neural compute system based on non-volatile memory, according to some embodiments.

FIGS. 2 illustrates example process 200 for assigning the input to the proper bit line for positive and negative vectors in a neural flash cell system, according to some embodiments. In step 202, process 200 can obtain input vector $X_i$. In step 204, process 200 can determine if it is a positive or negative vector. If there is a positive vector, then process 200 can proceed to step 206. If there is a negative vector, process 200 can proceed to step 210. In step 206, process 200 can turn off negative vector circuit ($-V_e$) for $X_i$ by turning off S3 306 and turning on S4 308 (S1-S4 are synapse 302-308 of FIG. 3 infra). In step 208, process 200 can turn on $+V_e$ input vector circuit for $X_i$ by turning on S1 302 and turning off S2 304. In step 210, process 200 can turn off $+V_e$ input vector circuit for $X_i$ by turning off S1 302 and turning on S2 304. In step 212, process 200 can turn on $-V_e$ input vector circuit for $X_i$ by turning on S3 306 and turning off S4 308.

In process 200 the inputs are a function of $X_i$. The inputs are translated into an electrical signal (e.g. a voltage) $V_1 \ldots V_N$. Each input value can be split into a positive value (e.g. a positive voltage) and/or a negative value (e.g. a negative voltage). The positive weights are input into a positive neuron (e.g. see positive neuron 318 infra). The negative weights are input into a negative neuron (e.g. see negative neuron 320 infra).

In one example, the neuron can have both a positive and a negative weight value. If a weight is positive then process 200 turns off the negative synapse. For example, if a weight $y_2$ is negative and there is a positive input, process 200 can turn off the positive synapse (e.g. by placing on a high threshold voltage on it, if it were a flash memory device, such that the positive synapse does not conduct). In this way, the inputs to the NVM compute cells (e.g. MLC flash cells) are a function of $X_i$. Depending on which cells (e.g. positive or negative) are turned on, then each synapse provides a neural-cell output (e.g. a current) that depends on input $X_i$ (e.g. a positive or negative $X_i$ input vector). In a positive output example, the bitline is a summation of the positive individual cell outputs. In a negative output example, the bitline is a summation of the negative individual cell outputs. If process 200 utilizes an analog to digital conversion on both neurons, then a digital representation of the output is utilized. The output to the combined bitline can be a subtraction of negative bitline from the positive bitline.

Figure 3:
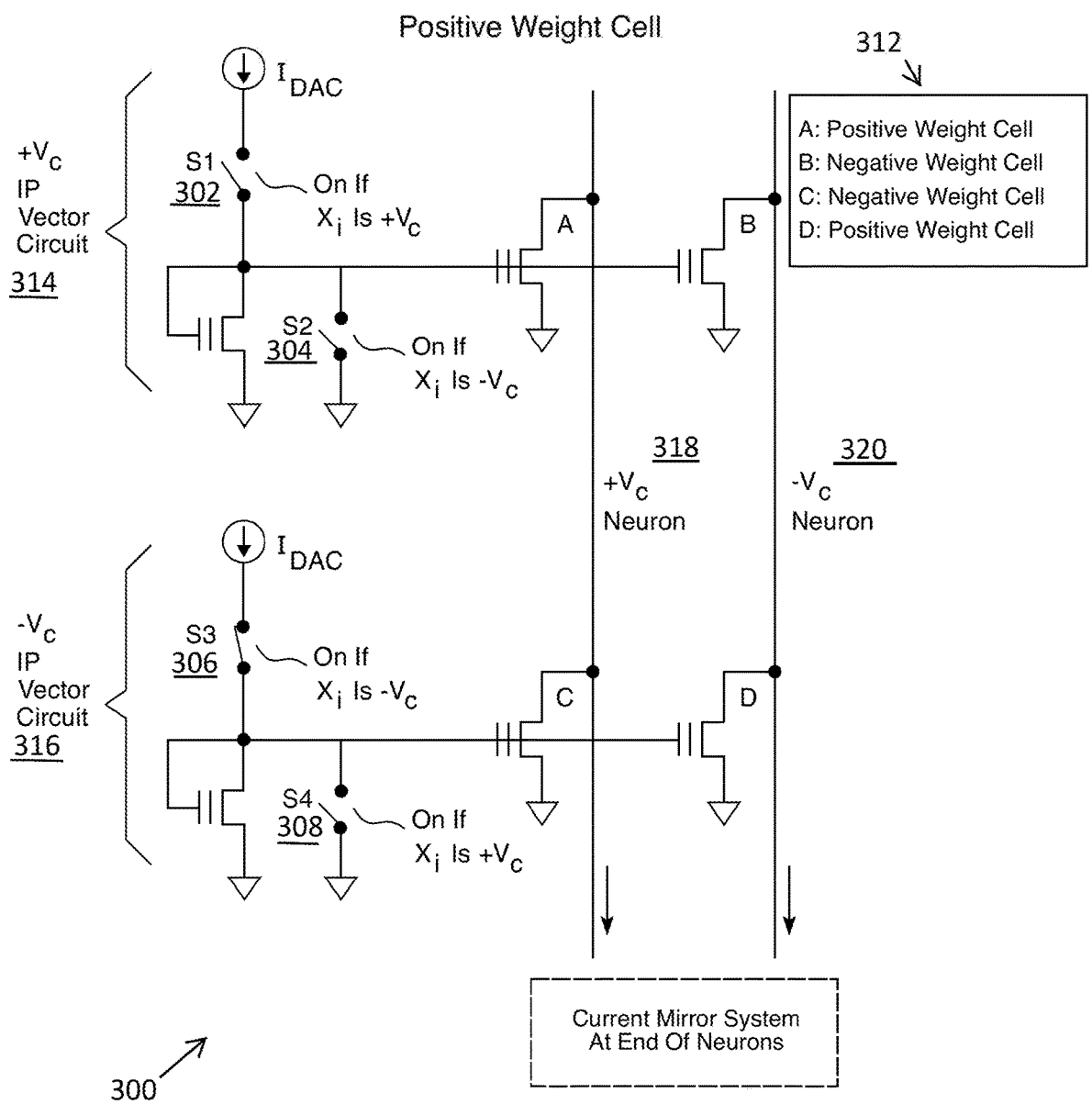
FIG. 3 illustrates an example system for implementation of process 200, according to some embodiments.

FIG. 3 illustrates an example system 300 for implementation of process 200, according to some embodiments. In one example of system 300, the negative values of the neuron current (320) can be subtracted from a positive neuron current (318). The inputs can be both positive and/or negative based on input to positive input (IP) vector circuit 314 or negative input (IP) vector circuit 316. System 300 includes states for synapses A-D provided in table 310. System 300 has four synapses (S1-S4 302-308). Depending on which combination is utilized, then table 310 can be used to have the appropriate synapse turn on the appropriate neuron, while the others are turned off. On the input side of system 300, the input current can be positive or negative (e.g. $X_i$ can have a sign). The weights can be positive or negative (e.g. $Y_i$ can have a sign). Based on the $Y_i$ signs, system 300 utilizes the appropriate synapses S1-S4 302-308 to access the appropriate positive or negative neuron 314-316.

In one example operation of system 300, when the weight is positive and the input is positive, then positive neuron 318 provides the output (e.g. a current) using synapse A. When the weight is negative and the input is positive, then the negative neuron 320 provides the output (e.g. a current) to the bitline using synapse B. When the weight is negative and the input is negative, positive neuron 318 provides the output (e.g. a current) using synapse C. When the weight is positive and the input is negative, negative neuron 320 provides the output using synapse D.

In another example operation of system 300, input $X_i$ can be positive or negative. When $X_i$ is positive, then system 300 can use a positive wordline and turn off the negative wordline. When the weight is positive then synapse A 302 is in an on state. When the weight is negative then synapse B 304 is in an on state. It is noted that when $X_i$ is negative then system 300 implements an opposite operation with respect to said synapses. For example, the positive wordline can be turned off and the negative wordline can be turned on. When the weight is positive, then system 300 can turn on synapse D 306. When the weight is negative, then system 300 can turn on synapse C 308.

A switch can turn on/off an input source (e.g. a current) and, thus, turn on/off an appropriate word line. For example, when the input is negative, then a specified switch turns on and a targeted wordline is grounded. This wordline is then turned off. In this way, a wordline can be turned on and off depending on the sign of the input.

Figure 4:
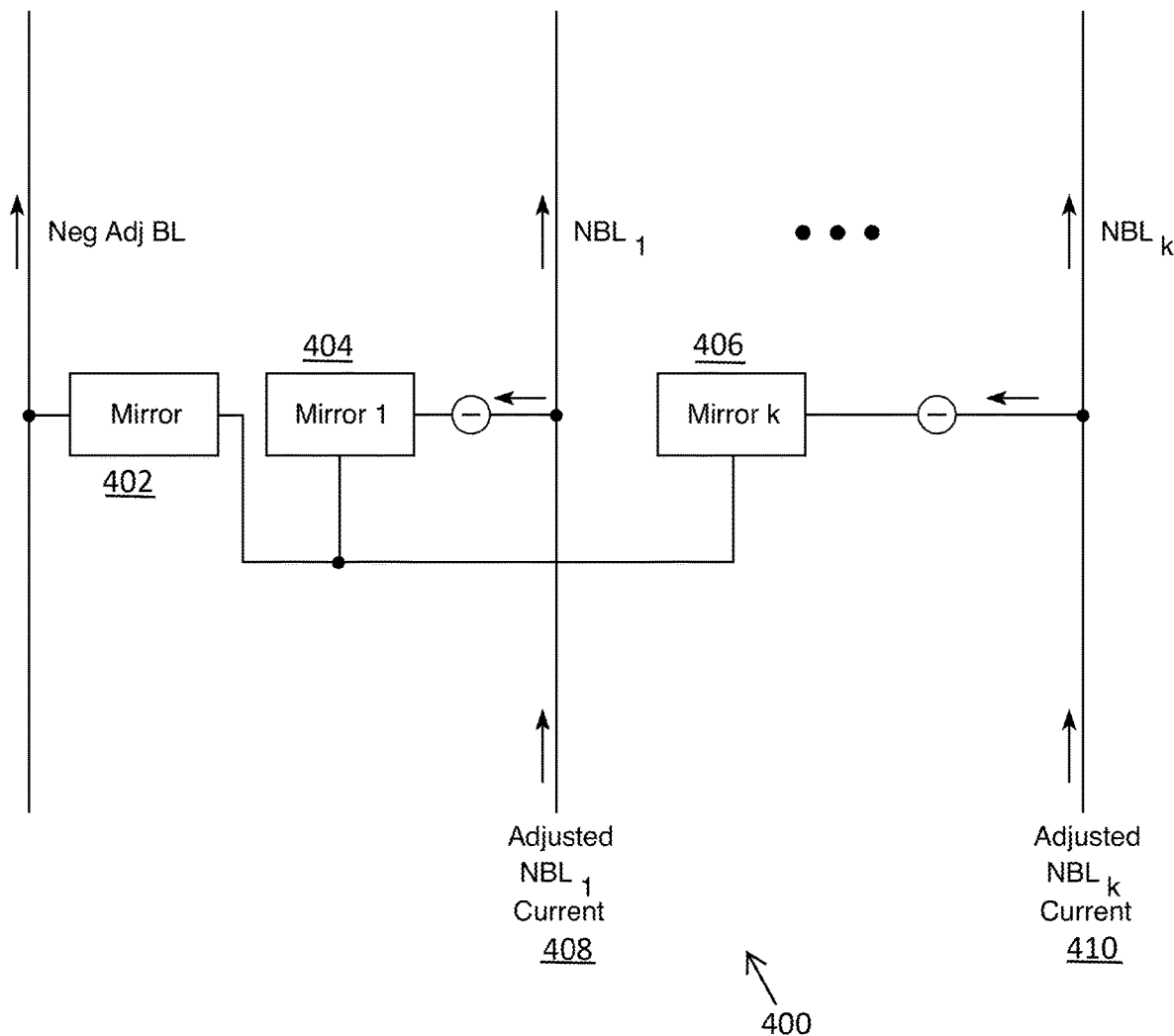
FIGS. 4-6 illustrate various example systems for implementing positive and negative neurons, according to some embodiments.
Figure 5:
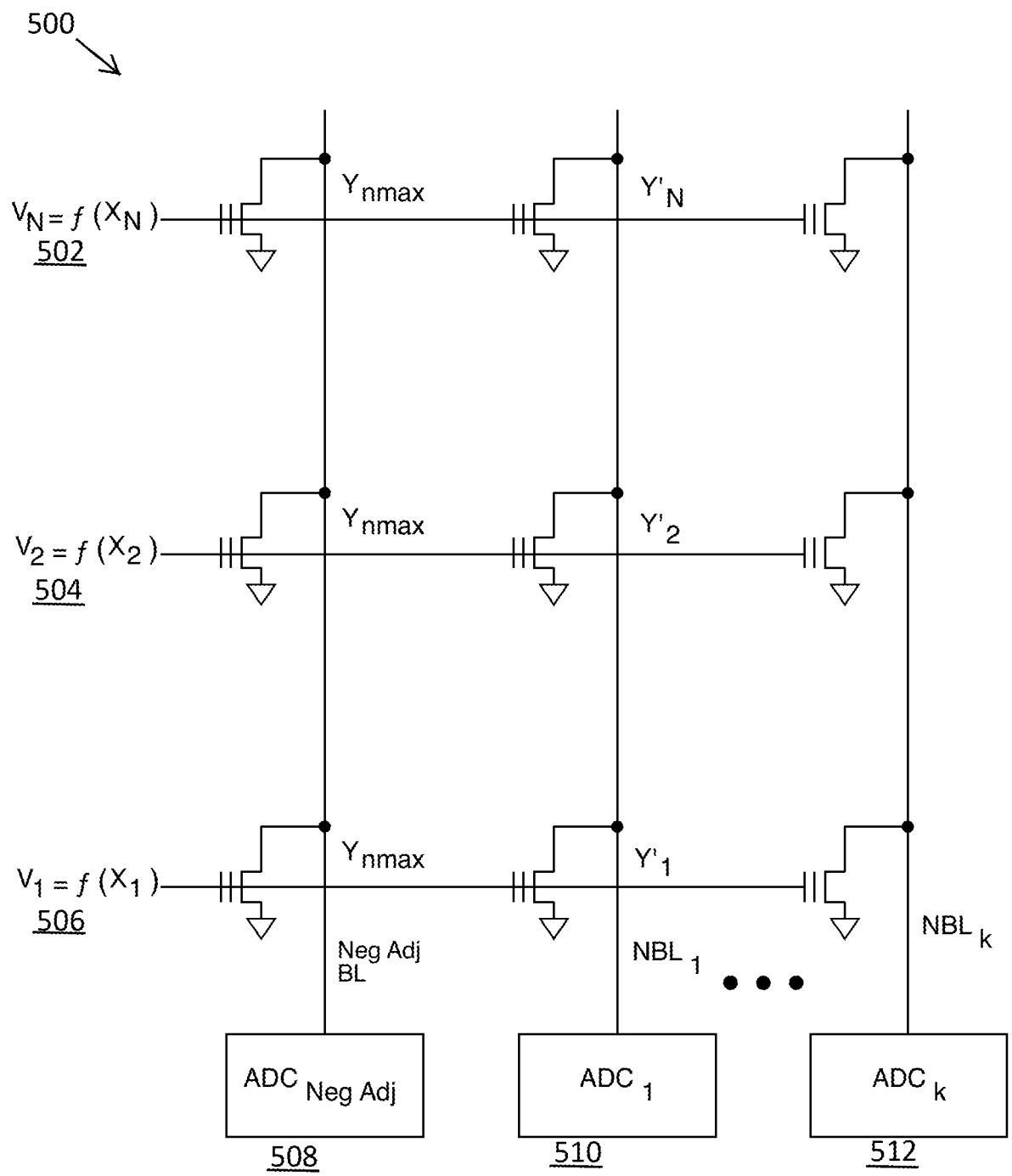
Figure 6:
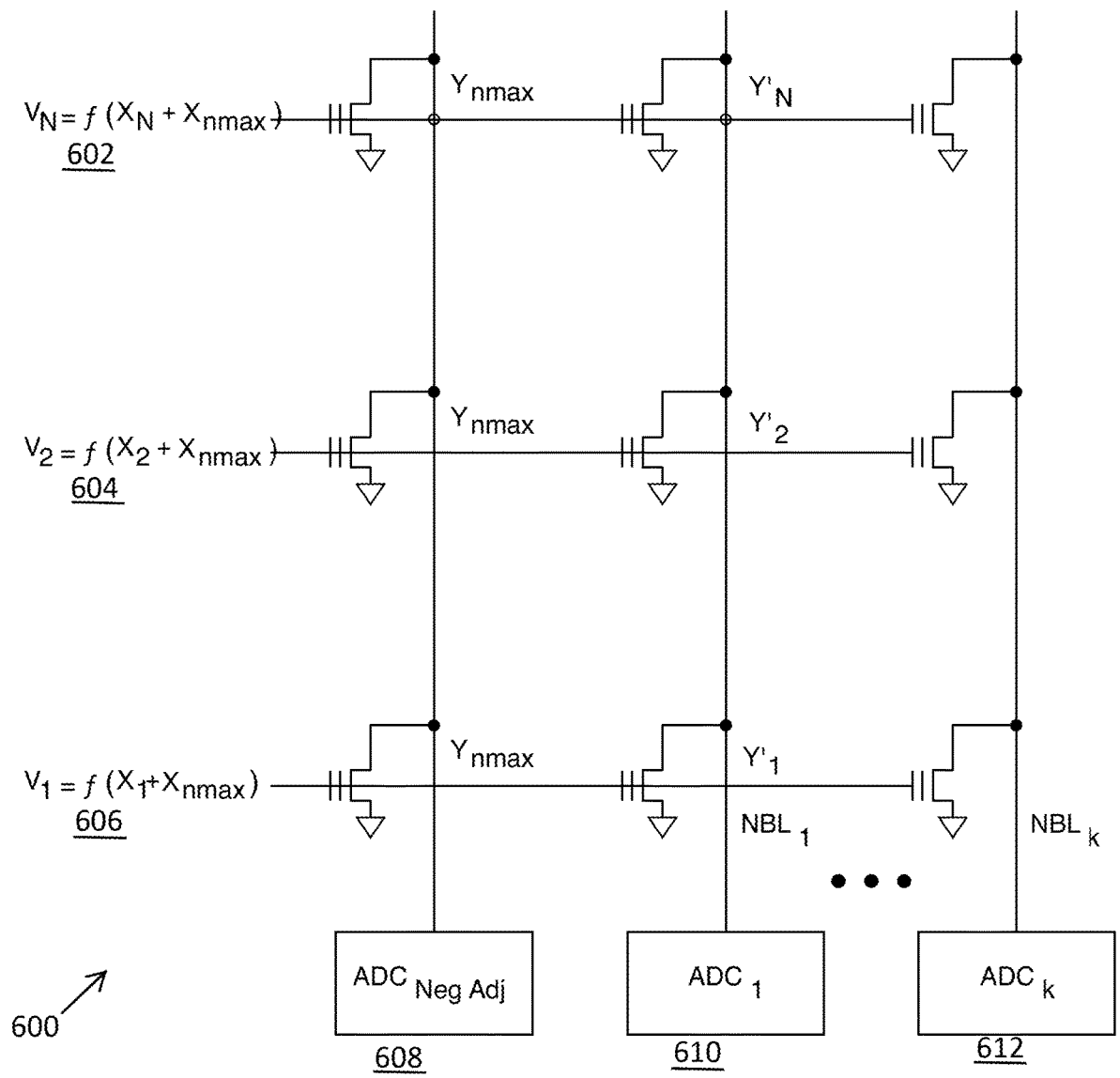

FIGS. 4-6 illustrate various example systems for implementing positive and negative neurons, according to some embodiments. Systems 400-600 can include positive neurons and negative neurons according to various example embodiments. Systems 400-600 can utilize negative weights on negative neurons and positive weights on positive neurons. Depending on the input values, systems 400-600 can provide a positive output (e.g. a current) in a positive neuron and a negative output in a negative neuron. The outputs can be the inputs multiplied by the respective weights. Systems 400-600 can subtract one output value from the other value and, accordingly, provide a final positive output value (e.g. a current) as a neural output.

The weights $Y_i$ can be both positive and/or negative. The greatest negative weight, $Y_{NMAX}$, in the neural array is selected. $Y_{NMAX}$=maximum ($|Y_i|$) for all i such that $Y_i<0$.

More specifically, FIG. 4 illustrates an example analog system where currents are directly subtracted through current mirrors 402-406. System 400 includes an adjustment neuron and k neurons. System 400 can include two currents and utilize a mirror adjustment current and/or subtract with other adjustment currents to provide an output current. System 400 can output adjusted neuron bitline (NBL) current(s) 408-410. When system 400 receives negative inputs, it provides an output using the following equation:

$$\Sigma(X_i*Y_i)=\Sigma((X_i+X_{NMAX})*(Y_i+Y_{NMAX}))-\Sigma(X_i*Y_{NMAX})-\Sigma(Y_i*X_{NMAX})-\Sigma(X_{NMAX}*Y_{NMAX})$$

Here, $X_{NMAX}$ is the largest magnitude of all expected negative input values, i.e. $X_{NMAX}$=maximum ($|X_i|$) for all i where $X_i<0$. In some instances, this may be determined by a training dataset or a test dataset. In the dataset, $X_{NMAX}$=maximum(|negative $X_i$|) for all possible or expected $X_i$ inputs.

FIGS. 5 and 6 illustrate examples systems 500-600 for digital implementations of neurons, according to some embodiments. Systems 500-600 convert the output bitlines to digital value(s) with ADCs 508-512 and 608-612 respectively.

In system 500, the inputs 502-506 are a function of $X_i$. $Y_i'=Y_i+Y_{NMAX}$. The neuron equation is $Eq^{neuron} \equiv \Sigma(X_i*Y_i)+b$ is now: $Eq^{neuron} \equiv \Sigma(X_i*Y_i')+b-\Sigma(X_i\cdot Y_{NMAX})$. The final ADC value after the negative weight adjustment is expressed with the following: $ADC_{1FINAL}=ADC_1-ADC_{NEGADJ}$ to $ADC_{kFINAL}=ADC_k-ADC_{NEGADJ}$.

In system 600, the inputs 602-606 are a function of both $X_i$ and $X_{NMAX}$. $Y_i'=Y_i+Y_{NMAX}$. System 600 can subtract the two digital numbers provided to obtain the output value. The following equation illustrates the subtraction of the two digital numbers $ADC_{1-k}$ and $ADC_{NEGADJ}$:

$$ADC_{1FINAL}=ADC_1-ADC_{NEGADJ}-X_{NMAX}*\Sigma(Y_i) \text{ to}$$
$$ADC_{kFINAL}=ADC_k-ADC_{NEGADJ}-X_{NMAX}*\Sigma(Y_i)$$

It is noted that $X_{NMAX}*\Sigma(Y_i)$ remains constant for each neuron across all inputs.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transistor form of machine-readable medium.

What is claimed as new and desired to be protected by Letters Patent of the United States is:

1. A method for computing neural network computation comprising:
   a plurality of neurons, coupled with a plurality of inputs, through a plurality of synapses:
      wherein each neuron output is given by an equation $\Sigma(X_i * Y_i) + b$ and wherein:
      $X_i * Y_i$ comprises the $i^{th}$ synapse of the neuron,
      $X_i$ comprises a set of $X_i$ input vectors, and wherein each $X_i$ input vector is translated into an equivalent electrical signal for an $i^{th}$ corresponding synapse of the plurality of neurons,
      $Y_i$ comprises a set of $Y_i$ weight vectors, wherein each $Y_i$ weight vector comprises a parameter for the $i^{th}$ corresponding synapse of the plurality of neurons
   wherein each synapse is a sub-system, wherein the sub-system comprises a negative vector neural circuit, a positive vector neural circuit, and a set of four non-volatile memory weight cells for computation;
   identifying the input vector x as a positive input vector or a negative input vector;
      case a) wherein the input vector x is identified as a positive input vector and the weight vector is positive, a positive input vector circuit activates a connection from the magnitude of the input to a positive weight cell, which in turn outputs a positive valued affine function $f(|X_i|*|Y_i|)$ to a positive accumulation output
      case b) wherein the input vector x is identified as a negative input vector and the weight vector is negative, a negative input vector circuit activates a connection from the magnitude of the input to a negative weight cell, which in turn outputs a positive valued affine function $f(|X_i|*|Y_i|)$ to a positive accumulation bitline
      case c) wherein the input vector x is identified as a negative input vector and the weight vector is positive, a negative input vector circuit activates a path from the magnitude of the input to the positive weight cell, which in turn outputs a positive valued affine function $f(|X_i|*|Y_i|)$ to a negative accumulation bitline
      case d) wherein the input vector x is identified as a positive input vector and the weight vector is negative, a positive input vector circuit activates a path from the magnitude of the input to the negative weight cell, which in turn outputs a positive valued affine function $f(|X_i|*|Y_i|)$ to a negative accumulation bitline
   wherein
      the positive accumulation bitline is comprised of $\Sigma(X_i*Y_i)+b_p$ for all i where $X_i*Y_i \geq 0$
      the negative accumulation bitline is comprised of $\Sigma(X_i*Y_i)+b_n$ for all i where $X_i*Y_i < 0$
      and $b_p+b_n=b$.

2. The neural network compute circuit of claim 1, wherein the affine function f( ) is the identity function.

3. The neural network compute circuit of claim 1, wherein:
   for case a) the positive input vector circuit activates a connection from the magnitude of the input to both the positive weight, which in turn connects to the positive accumulation bitline, and the negative weight, which in turn connects to the negative accumulation line; however, in this case the negative weight value is set to zero
   for case b) the negative input vector circuit activates a connection from the magnitude of the input to both the negative weight cell, which in turn outputs to a positive accumulation bitline, and the positive weight, which in turn connects to the negative accumulation line; however, in this case the positive weight value is set to zero
   for case c) the positive input vector circuit activates a connection from the magnitude of the input to both the negative weight, which in turn connects to the negative accumulation bitline, and the positive weight, which in turn connects to the positive accumulation line; however, in this case the positive weight value is set to zero
   for case d) the negative input vector circuit activates a connection from the magnitude of the input to both the positive weight cell, which in turn outputs to a negative accumulation bitline, and the negative weight, which in turn connects to the positive accumulation line; however, in this case the negative weight value is set to zero.

4. The neural circuit of claim 3, wherein the affine function f( ) is the identity function.

5. A method comprising:
   providing a neural flash cell system, wherein the neural flash cell system comprises a negative vector neural circuit, a positive vector neural circuit, and a set of four neural cell synapses;
   identifying the input vector x as a positive input vector or a negative input vector;
   wherein the input vector x is identified as the positive input vector, and
      turning off a negative vector circuit for the input vector x by turning off a third neural synapse of the set of four synapses and turning on a fourth neural synapse of the set of four synapses, and
      turning on a positive input vector circuit for x by turning on a first neural synapse and turning off a second neural synapse;
   wherein the input vector x is identified as the positive input vector, and
      turning off positive input vector circuit for x by turning off the first neural synapse and turning on the second neural synapse, and
      turning on negative vector circuit for the input vector x by turning on the third neural synapse and turning off the fourth neural synapse.

6. The method of claim 5 further comprising:
   adding the positive input vector and the positive input vector into the neural flash cell system to obtain the input vector x.

7. A neural network compute circuit comprising:
   a plurality of neurons, coupled with a plurality of inputs, through a plurality of synapses, and an adjustment neural cell:
      wherein each neuron output is given by an equation $\Sigma(X_i' * Y_i') + b$ and wherein:
      $X_i' * Y_i'$ comprises the $i^{th}$ synapse of the neuron,
      $X_i$ comprises a set of original input vectors, wherein each $X_i$ is the original unadjusted input vector,
      $X_i'$ comprises a set of $X_i'$ input vectors, and wherein each $X_i'$ input vector is translated into an equivalent electrical signal for an $i^{th}$ corresponding synapse of the plurality of neurons, calculated as $X_i'=X_i+X_{NMAX}$
      $Y_i$ comprises a set of original weight vectors, wherein each $Y_i$ is the original unadjusted weight vector, $Y_i'$ comprises a set of $Y_i'$ adjusted weight vectors, wherein each $Y_i'$ adjusted weight vector comprises a level for the $i^{th}$ corresponding neural cell of the plurality of neural cells calculated as
$Y_i' = Y_i + Y_{NMAX}$
and the final output is calculated as $$\Sigma(X_i * Y_i) = \Sigma(X_i' * Y_i') - \Sigma(X_i' * Y_{NMAX}) - \Sigma(Y_i * X_{NMAX}).$$

8. The neural circuit of claim 7, wherein $X_{NMAX}$ is a maximum negative input value expected for the neural circuit; $X_{NMAX}$=maximum($|X_i|$) for all i where $X_i<0$ for all expected values of $X_i$.

9. The neural circuit of claim 8, wherein the expected values of $X_i$ are estimated using a dataset.

10. The neural circuit of claim 7, wherein $X_{NMAX}$ is set to a fixed vale, e.g. zero.

11. The neural circuit of claim 7, wherein $Y_{NMAX}$ comprises a largest negative weight in the neuron circuit; $Y_{NMAX}$=maximum($|Y_i|$) for all i where $Y_i<0$.

12. The neural circuit of claim 11, wherein $Y_{NMAX}$ is set to a fixed vale, e.g. zero.

13. The neural network compute circuit of claim 7, wherein the $\Sigma(X_i'*Y_i')$ is in one neuron for each output in the plurality of neurons and one $\Sigma(X_i'*Y_{NMAX})$ adjustment neuron is added to the plurality of neurons.

14. The neural network compute circuit of claim 13, wherein the output from the $\Sigma(X_i'*Y_{NMAX})$ adjustment neuron is subtracted from each of the $\Sigma(X_i'*Y_i')$ neurons.

15. The neural network compute circuit of claim 13, wherein the output from the $\Sigma(X_i'*Y_{NMAX})$ adjustment neurons and the output of the $\Sigma(X_i'*Y_i')$ neuron are converted to digital through ADCs.

16. The neural network compute circuit of claim 15, wherein the ADC output from the $\Sigma(X_i'*Y_{NMAX})$ adjustment neuron is subtracted from the ADC output of the $\Sigma(X_i'*Y_i')$ neurons.

17. The neural circuit of claim 13, wherein the adjustment neuron provides a mirror adjustment current.

18. The neural circuit of claim 7, wherein each synapse output of the plurality of neural cells is coupled with a current input source of the plurality of current input sources.

19. The neural circuit of claim 18, wherein the outputs to be subtracted are currents taken through a set of current mirrors.

20. The neural circuit of claim 19, wherein the neuron receives two currents and utilizes a mirror adjustment current.

21. The method of claim 20, wherein each input value is split into a positive voltage and a negative voltage.

22. The neural circuit of claim 7, wherein the plurality of non-volatile memory cells are MLC flash cells.

23. The neural circuit of claim 7, wherein the plurality of non-volatile memory cells are SLC flash cells are ordered from a most significant bit (MSB) level to a least significant bit (LSB) level.

* * * * *